United States Patent
Deptolla

(10) Patent No.: US 7,425,038 B2
(45) Date of Patent: Sep. 16, 2008

(54) VEHICLE SEAT

(75) Inventor: Bernd Deptolla, Niedernwöhren (DE)

(73) Assignee: Faurecia Autositze GmbH, Stadthagen (DE)

( * ) Notice: Subject to any disclaimer, the term of this patent is extended or adjusted under 35 U.S.C. 154(b) by 113 days.

(21) Appl. No.: 11/634,220

(22) Filed: Dec. 6, 2006

(65) Prior Publication Data

US 2007/0126272 A1    Jun. 7, 2007

(30) Foreign Application Priority Data

Dec. 6, 2005    (DE) .................. 10 2005 058 367

(51) Int. Cl.
    *B60N 2/22* (2006.01)
(52) U.S. Cl. .................. 297/362.11; 297/378.12
(58) Field of Classification Search .................. 297/362, 297/362.11, 367, 378.1, 378.12
    See application file for complete search history.

(56) References Cited

U.S. PATENT DOCUMENTS

| | | | |
|---|---|---|---|
| 4,382,630 A | | 5/1983 | Weston |
| 5,295,730 A | * | 3/1994 | Rees ........................ 297/361.1 |
| 5,299,853 A | * | 4/1994 | Griswold et al. ........ 297/362.12 |
| 5,435,624 A | * | 7/1995 | Bray et al. ............. 297/362.11 |
| 5,590,932 A | * | 1/1997 | Olivieri ....................... 297/367 |
| 6,273,508 B1 | * | 8/2001 | Lange .................... 297/378.12 |
| 6,629,732 B1 | * | 10/2003 | Ursel et al. ............ 297/362.11 |
| 7,066,543 B2 | * | 6/2006 | Yu ......................... 297/378.12 |
| 7,192,089 B2 | * | 3/2007 | Boudinot ............... 297/362.11 |
| 7,243,996 B2 | * | 7/2007 | Daniels ................. 297/378.12 |

FOREIGN PATENT DOCUMENTS

DE    197 37 269 C2    11/2000
FR    2 743 764    7/1997

* cited by examiner

*Primary Examiner*—Peter R. Brown
(74) *Attorney, Agent, or Firm*—Shlesinger, Arkwright & Garvey LLP

(57) ABSTRACT

Vehicle seat includes a seat frame, a backrest frame with a motor fastened thereto, a rotary adjustment fitting with a backrest-side fitting half attached to backrest frame, and a seat-side fitting half, rotatable relative to one another via a shaft driven by the motor. There is a locking device shiftable via an actuating device from its locked position to a released position for folding backrest frame forward into a functional position. In its locked use position backrest frame can be pivoted relative to seat frame within a comfort range by motor. Locking device is provided for locking seat-side fitting half of rotary adjustment fitting on seat frame in use position and in backrest frame functional position, when locking device is in its released position, backrest frame is foldable forwardly via rotary adjustment fitting into its functional position, and can be raised by motor from functional position to upright use position.

10 Claims, 3 Drawing Sheets

VEHICLE SEAT

CROSS-REFERENCE TO RELATED APPLICATIONS

This application claims the priority of German application no. 10 2005 058 367.9, filed 6 Dec. 2005, and which is incorporated herein by reference.

FIELD OF THE INVENTION

The invention relates to a vehicle seat. More particularly, the invention relates to a vehicle seat which includes a seat frame, a backrest frame with a motor fastened thereto, a rotary adjustment fitting with a backrest-side fitting half attached to backrest frame, and a seat-side fitting half, rotatable relative to one another via a shaft driven by the motor.

BACKGROUND OF THE INVENTION

Backrests are generally capable of pivoting within a comfort range in their upright use position. Furthermore, they can be unlatched to a certain extent, allowing them to be folded forward to a functional position, for example an easy-entry position or a cargo position.

In addition to purely mechanical adjustments, in which the backrest is manually released and folded forward by the user, and in which the adjustment within the comfort range is made without auxiliary power, for example against a biasing of the backrest, motorized adjustments are also known. However, motorized adjustments of this type generally do not enable a rapid forward folding.

DE 197 37 269 C2 discloses a motor vehicle seat of the type described above, having an electrically actuated rotary adjustment fitting, one fitting part of which is fixedly attached to the seat frame while the other fitting part is fixedly attached to the backrest frame. Further, a locking fitting component, the inclination of which can be adjusted via a rotary adjustment gearing, is provided, which is detachably locked to the fitting part that is affixed to the backrest frame, wherein the locking must be disengaged in order to allow the backrest to be folded.

FR 2 743 764 B1 discloses a joint mechanism for a vehicle seat having two parts that are capable of pivoting relative to one another, and a rotary adjustment fitting, the housing of which accommodates a wobble gear set and a stop-latch adjustment mechanism for locking and releasing to allow the folding function.

OBJECTS AND SUMMARY OF THE INVENTION

An object of the invention is to overcome the drawbacks of the prior art.

Another object of the invention is to provide a vehicle seat that enables the user to implement both a rapid folding and a comfortable inclination adjustment of the backrest.

This object is achieved with a vehicle seat including a seat frame and a backrest frame. A motor is attached to the backrest frame. There is a rotary adjustment fitting with a backrest-side fitting half fastened to the backrest frame, and a seat-side fitting half, and the backrest-side and seat-side fitting halves are rotatable relative to one another via a shaft driven by the motor. A locking device is provided that is shiftable via an actuation element from its locked position to a released position for folding the backrest frame forward into a functional position, in use. Further, the backrest frame, in its locked use position, is pivoted relative to the seat frame within a comfort range by the motor, in use. Also, the locking device is provided for the purpose of locking the seat-side fitting half of the rotary adjustment fitting on the seat frame when the backrest frame is in the upright use position, in use, and in the functional position, when the locking device is in the released position, the backrest frame with the rotary adjustment fitting can be folded forward to the functional position, and the backrest frame can be raised by the motor from the forward-folded functional position to the use position, in use.

According to the invention a manual folding of the backrest from its use position to its functional position, and further a motorized inclination adjustment and a motorized adjustment to the upright position are enabled. According to the invention, these three functions are united in a compact, space-saving locking and adjustment system having a surprisingly simple construction, in which a rotary adjustment fitting is fixedly attached at its backrest-side fitting half to the backrest frame, but at its seat-side fitting half it is attached not directly to the seat frame, but rather to a locking device, which, when locked, enables adjustment via an electric motor. The user can manually release the lock, for example, and fold the backrest forward along with the electric motor that is fastened to the backrest frame and along with the rotary adjustment fitting. In the functional position—for example a cargo position—the locking device can again be locked, so that a motorized adjustment back to the upright use position is subsequently possible.

As the locking device, a catch that is hinged to the seat frame can be provided, for example, which engages in a positive connection with a component, for example an externally toothed disk, that is fastened to the seat-side fitting half of the rotary adjustment fitting. In this, the catch can be secured in the locked position, free from rattling, for example, by a spring-preloaded holding cam, which again is actuated by the user to implement a release.

Alternatively, the seat-side fitting half of the rotary adjustment fitting can also be fastened to a stop-latch adjustment fitting, which can be released by the user, for example, via a handle. In this embodiment, the rotary adjustment fitting and the stop-latch adjustment fitting can be placed directly adjacent to one another as box fittings, and can be mounted as a compact unit between the backrest frame and the seat frame.

Relative terms such as left, right, up, and down are for convenience only and are not intended to be limiting.

Below, the invention will be detailed with reference to the attached set of drawings illustrating a number of embodiments.

DETAILED DESCRIPTION OF THE INVENTION

In a locked, upright use position of a motor vehicle seat 1, a seat frame 2 and a backrest frame 3 that is hinged to the former at a backrest axis A are shown. A geared motor 4 is fastened to the backrest frame 3, and is used in the inclination adjustment of the backrest frame 3 in its upright use position, and in returning the backrest frame 3 from a forward-folded cargo position back to an upright use position.

Figure 1:
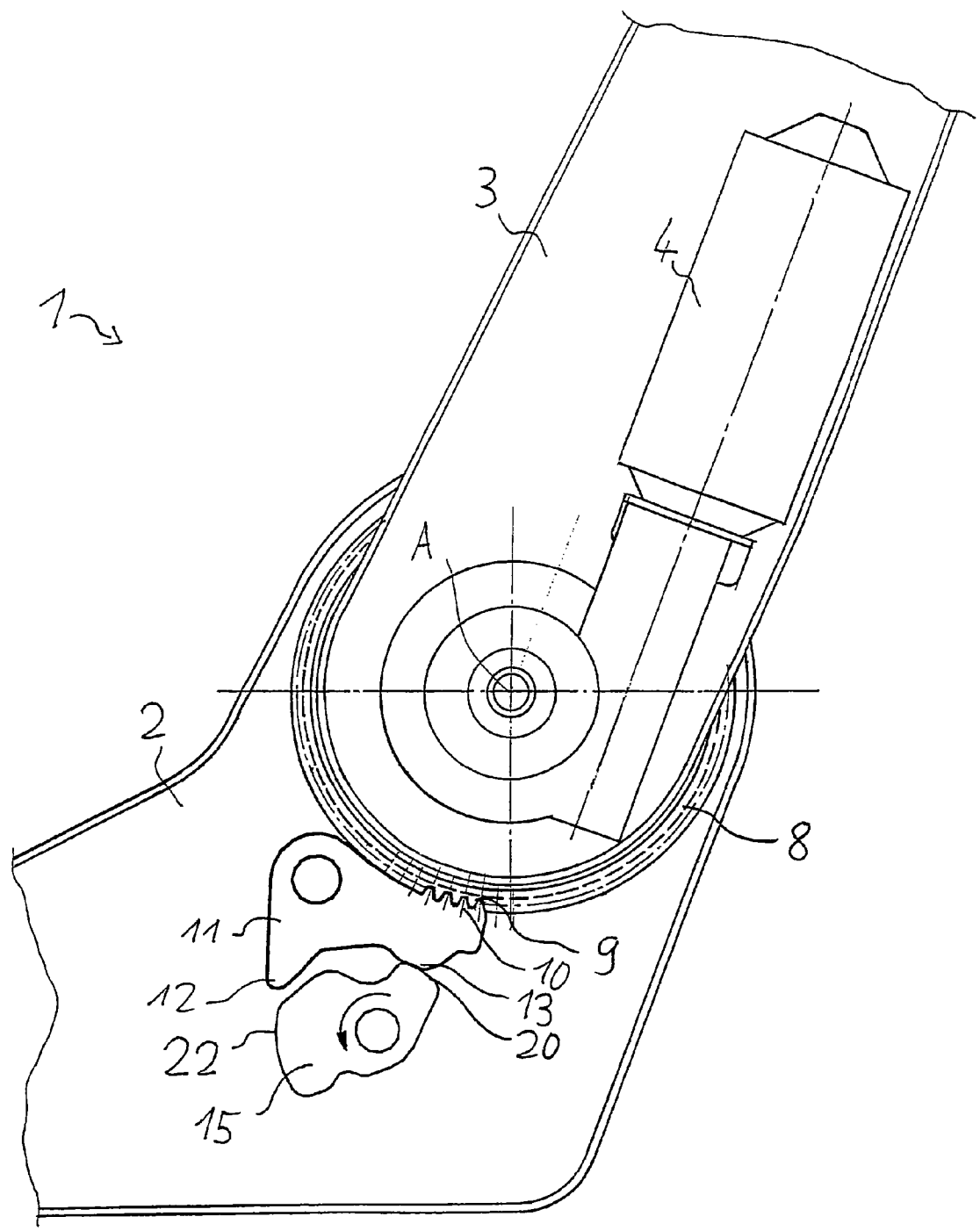
FIG. 1 is a longitudinal section or side view of the area of attachment between the backrest and the seat frame of a first embodiment, with the use position locked in place.
Figure 2:
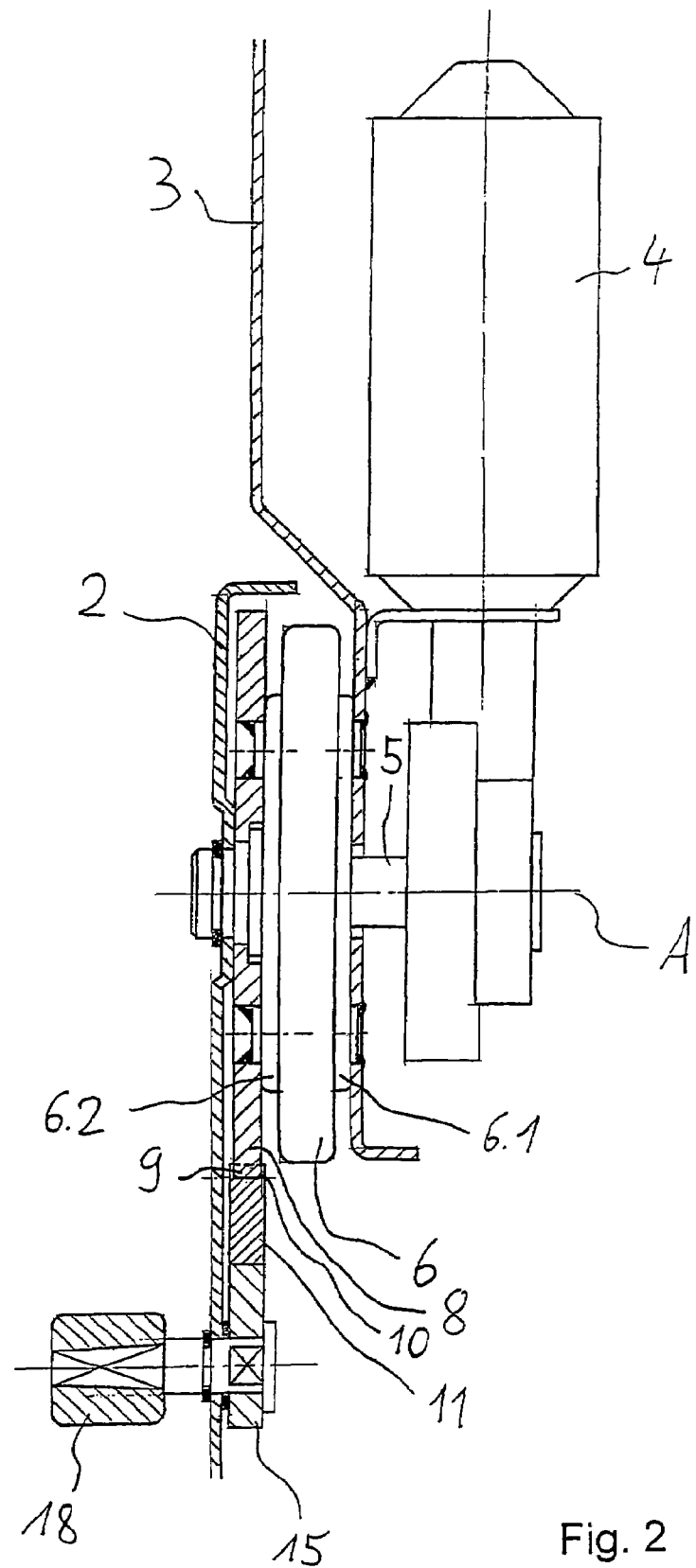
FIG. 2 is a cross section through the arrangement according to the embodiment of FIG. 1.

In the embodiment shown in FIGS. 1 and 2, a rotary adjustment fitting 6 structured as a box fitting 6 is mounted between the backrest frame 3 and the seat frame 2, wherein the fitting half 6.1 of the fitting that is on the backrest side—shown on the right in FIG. 2—is fastened, for example welded, to the backrest frame 3, while the fitting half 6.2 on the seat side—shown on the left in FIG. 2—is fastened, for example welded, to an externally toothed disk 8.

The externally toothed disk 8 can, for example, be circular in structure and can be pivoted relative to the seat frame 2 in the backrest pivoting axis A. It is equipped on its external periphery with teeth 9, which positively engage with teeth 10 of a toothed catch 11 that is hinged to the seat frame 2. The toothed catch 11 includes a nose 12 in the forward area of its lower side, and a contact surface 13 in the rear area of its lower side. A holding cam 15 is also hinged to the seat frame 2 and can be pivoted via a handle 18, wherein the handle 18 can be structured, for example, as a lever 18 or a grip 18 provided on the outside. The holding cam 15 is preloaded in the counterclockwise direction in FIG. 1 via a spring, and is pivoted in the clockwise direction by the user via the handle 18. In the locked use position shown in FIG. 1, the holding cam 15 lies with a biasing cam 20, which rises under the effect of the spring preloading, against the contact surface 13 of the toothed catch 11, and thus effects an upward biasing of the toothed catch 11 with its teeth 10 against the teeth 9 of the disk 8, thus ensuring a rattle-free locking of the backrest frame 3.

An output shaft 5 for the geared motor 4 extends through the backrest frame 3 into the rotary adjustment fitting 6, and rotates with the actuation of the fitting halves 6.1, 6.2 relative to one another. In the locked state shown in FIGS. 1 and 2, the fitting half 6.2 on the seat side is firmly locked via the externally toothed disk 8 and the toothed catch 11 to the seat frame 2, so that the motor 4 pivots the backrest frame 3 relative to the seat frame 2 around the pivoting axis A.

At its forward area, i.e. on the left in FIG. 1, the holding cam 15 includes a radial cam 22, which in the non-actuated, locked position shown in FIGS. 1 and 2 is not relevant; with the actuation of the handle 18, the holding cam 15 pivots clockwise, causing the biasing cam 20 to be raised off of the contact surface 13. With this, the toothed catch 11 generally drops downward; complementary—or in case the teeth 9, 10 become jammed—the radial cam 22 presses against the nose 12 of the toothed catch 11, pivoting it somewhat in the clockwise direction. This causes the teeth 9, 10 to disengage, releasing the backrest frame 3.

Thus by actuating the handle 18 the user can release the backrest frame 3 and—regardless of the respective pivoting position of the backrest frame 3 relative to the seat frame 2—can fold the entire backrest frame 3 forward, along with the geared motor 4, the rotary adjustment fitting 6 and the disk 8. In the forward-folded cargo position, the teeth 10 of the toothed catch 11 again engage with the teeth 9 of the disk 8. The backrest frame 3 can then be raised again to the upright use position via the motor.

Figure 3:
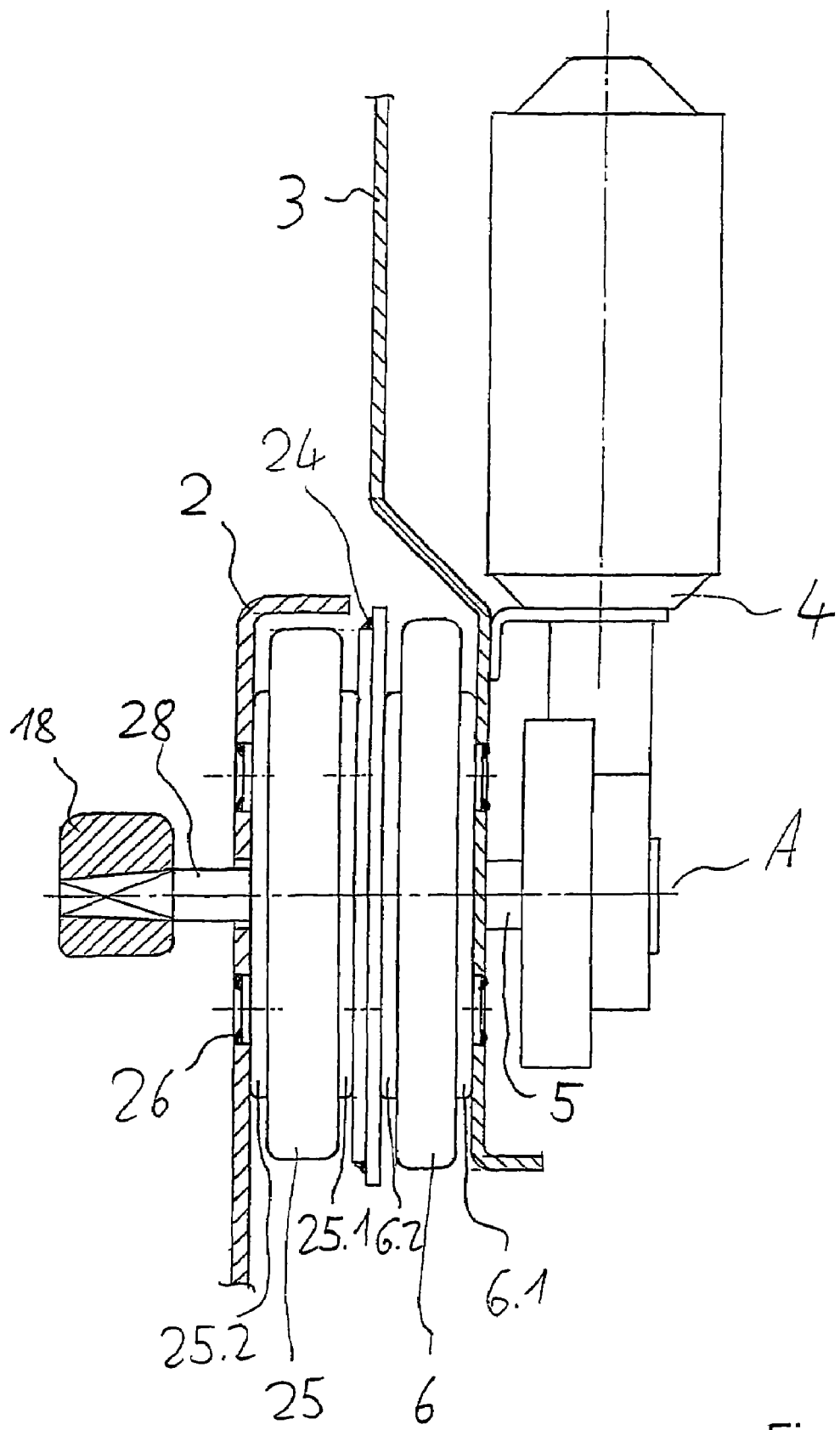
FIG. 3 is a corresponding cross-section according to a further embodiment.

In the second embodiment shown in FIG. 3, in turn, the geared motor 4 is welded to the backrest frame 3, and the rotary adjustment fitting 6, structured as a box fitting 6, is welded at its backrest-side fitting half 6.1 to the backrest frame 3. The seat-side fitting half 6.2, however, is rigidly fastened, for example via a welded joint 24, to the backrest-side fitting half 25.1 of a stop-latch adjustment fitting 25 that is structured as a box fitting 25. The seat-side fitting half 25.2 of the stop-latch adjustment fitting 25 is in turn rigidly fastened to the seat frame 2, for example via a welded joint 26. In this manner, the stop-latch adjustment fitting 25 enables a secure locking of its fitting halves 25.1 and 25.2 to one another, and thus also of the seat-side fitting half 6.2 of the rotary adjustment fitting 6 to the seat frame 2. The handle 18 in this embodiment is arranged so as to pivot in the backrest axis A, and rotates an actuating shaft 28 that extends from the outside through the seat frame 2 into the stop-latch adjustment fitting 25, whereby the fitting halves 25.1, 25.2 of the stop-latch adjustment fitting that are locked to one another are released. Therefore by actuating the handle 18, the fitting halves 25.1, 25.2, and thus also the components that are welded to these, i.e. the seat-side fitting half 6.2 of the rotary adjustment fitting 6 and the backrest frame 2, are released from one another.

Thus, in this embodiment as well, when the stop-latch adjustment fitting 25 is in the locked position, the geared motor 4 pivots the backrest frame 3 relative to the seat frame 2 within a comfort range via the rotary adjustment fitting 6. When the handle 18 is actuated, the stop-latch adjustment fitting 25 is released, so that the backrest frame 3 along with the rotary adjustment fitting 6 can be folded forward relative to the seat frame 2, and can be relocked in the cargo position, so that a motorized return to the use position is subsequently possible.

The rotary adjustment fitting configured as a box fitting 6 may be positioned on the exterior side of the backrest frame 3.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
   a) a seat frame;
   b) a backrest frame;
   c) a motor being attached to the backrest frame;
   d) a rotary adjustment fitting with a backrest-side fitting half fastened to the backrest frame, and a seat-side fitting half, the backrest-side and seat-side fitting halves being rotatatable relative to one another via a shaft driven by the motor;
   e) a locking device shiftable via an actuation element from its locked position to a released position for folding the backrest frame forward into a functional position, in use;
   f) the backrest frame, in its locked use position, being pivoted relative to the seat frame within a comfort range by the motor, in use;
   g) the locking device being provided for the purpose of locking the seat-side fitting half of the rotary adjustment fitting on the seat frame when the backrest frame is in the upright use position, and in the functional position;
   h) when the locking device is in the released position, the backrest frame with the rotary adjustment fitting can be folded forward to the functional position; and
   i) the backrest frame can be raised by the motor from the forward-folded functional position to the use position, in use.

2. Vehicle seat according to claim 1, wherein:
   a) the rotary adjustment fitting is configured as a box fitting positioned on the exterior side of the backrest frame.

3. Vehicle seat according to claim 1, wherein:
   a) the locking device includes an element which is torsionally stiffly attached to the seat-side fitting part of the rotary adjustment fitting, and a catch which is hinged to the seat frame for positive engagement with the torsionally stiffly attached element in the use position and in the functional position of the backrest frame.

4. Vehicle seat according to claim 3, wherein:
a) the catch is pressed into its locked position by a holding cam which is hinged to the seat frame and which is spring preloaded, and the holding cam is pivotable via an actuating device to release the catch.

5. Vehicle seat according to claim 4, wherein:
a) the catch includes a nose, against which nose the holding cam that is pivoted via the actuating device presses with a radial cam, thereby pivoting the catch.

6. Vehicle seat according to claim 3, wherein:
a) the locking device includes an externally toothed disk rigidly fastened to the seat-side fitting part of the rotary adjustment fitting, and the teeth of which externally toothed disk engage in the locked position with teeth of the catch.

7. Vehicle seat according to claim 1, wherein:
a) a stop-latch adjustment fitting is provided between the rotary adjustment fitting and the seat frame, and which stop-latch adjustment fitting is rigidly attached at its seat-side fitting half on the seat frame and at its backrest-side fitting half to the seat-side fitting half of the rotary adjustment fitting; and
b) the stop-latch adjustment fitting can be shifted via an actuating device between a locked position, in which the seat-side fitting half of the rotary adjustment fitting on the seat frame is locked in place, and a released position.

8. Vehicle seat according to claim 7, wherein:
a) the stop-latch adjustment fitting is configured as a box fitting.

9. Vehicle seat according to claim 7, wherein:
a) the stop-latch adjustment fitting is configured as a box fitting; and
b) the rotary adjustment fitting configured as a box fitting and the stop-latch adjustment fitting configured as a box fitting are connected to one another as a unit, between the backrest frame and the seat frame.

10. Vehicle seat according to claim 1, wherein:
a) the motor is a geared motor.

* * * * *